May 5, 1970

L. M. CARREIRA ET AL 3,510,419

PHOTOELECTROPHORETIC IMAGING METHOD

Filed July 13, 1967

*INVENTOR.*
VSEVOLOD TULAGIN
LEONARD M. CARREIRA
BY

*ATTORNEY*

United States Patent Office 3,510,419
Patented May 5, 1970

3,510,419
PHOTOELECTROPHORETIC IMAGING
METHOD
Leonard M. Carreira, Webster, and Vsevolod Tulagin,
 Rochester, N.Y., assignors to Xerox Corporation,
 Rochester, N.Y., a corporation of New York
Continuation-in-part of application Ser. No. 384,737,
 July 23, 1964, now Patent No. 3,384,565. This application July 13, 1967, Ser. No. 653,153
Int. Cl. B01k 5/00; G03g 13/22
U.S. Cl. 204—181
12 Claims

ABSTRACT OF THE DISCLOSURE

An electrophoretic imaging system wherein the imaging layer is a solid dispersion of photosensitive particles in a waxy matrix. Prior to exposure to imagewise actinic electromagnetic radiation the solid matrix in which the photosensitive particles are dispersed is melted allowing particles to migrate in response to an electric field forming a particle migration image.

BACKGROUND OF THE INVENTION

This invention relates in general to imaging systems and, more specifically, to an improved electrophoretic imaging system. This application is a continuation-in-part of our copending application Ser. No. 384,737, filed July 1964 in the U.S. Pat. Office, now U.S. Pat. No. 3,384,565.

Application Ser. No. 384,737 describes and claims an electrophoretic imaging system capable of producing color images which utilizes electrically photosensitive particles. In such an imaging system variously colored light absorbing particles are suspended in a non-conductive liquid carrier. The suspension is placed between electrodes, one of which is at least partially transparent, and subjected to a potential difference while the suspension is exposed to an image through the partially transparent electrode. As these steps are completed, selective particle migration takes place in image configuration providing a visible image at one or both of the electrodes. Where the positive image is formed on a conductive transparent electrode, ordinarily the image must be transferred to a receiving sheet so that the relatively expensive conductive transparent electrode may be reused. An essential component of the system is the suspended particles which must be electrically photosensitive and which apparently undergo a net change in charge polarity upon exposure to activating electromagnetic radiation through interaction with one of the electrodes. In a monochromatic system, particles of a single color are used, producing a single colored image similar to conventional black and white photography. In a polychromatic system, the images are produced in natural color because mixtures of particles of two or more different colors which are each sensitive to light of a specific wavelength or narrow range of wavelengths are used. Particles used in this system must have both intense pure colors and be highly photosensitive.

After the exposure and particle migration steps are completed, the electrodes are separated and the carrier liquid is allowed to evaporate. This leaves images on one or both of the electrodes made up of selectively deposited particles. Since these electrodes may consist of relatively expensive materials or may be integral parts of the imaging apparatus, it is generally desirable to fix the images on a receiving sheet for later viewing use. This permits the original electrode to be reused immediately to produce further images.

In order to produce an electric field across the suspension during the imaging process, the transparent electrode generally has a conductive surface such as tin oxide and the other electrode has a relatively insulating surface behind which is a second conductive electrode. This process is capable of producing excellent color images. However, it would be desirable to simplify the process by eliminating the need to handle highly pigmented liquids. The handling of highly pigmented liquids is inherently messy and inconvenient. In addition, it is necessary to insure that the pigments will remain in suspension for long periods of time.

SUMMARY OF THE INVENTION

It is, therefore, an object of this invention to provide an electrophoretic imaging system which overcomes the above noted disadvantages.

It is another object of this invention to provide an electrophoretic imaging system which does not require the handling of highly pigmented liquids.

It is another object of this invention to provide an electrophoretic imaging system which does not require pigments to be suspended for long periods of time.

It is another object of this invention to provide an electrophoretic imaging system which does not require relatively complex liquid handling equipment.

It is another object of this invention to provide an electrophoretic imaging system which is relatively simple to operate.

It is another object of this invention to provide an electrophoretic imaging system which does not require the use of relatively volatile liquids.

The foregoing objects and others are accomplished in accordance with this invention by providing an electrophoretic imaging system wherein a pair of conductive electrodes are provided. One of the electrodes is at least partially transparent. An imaging layer comprising photosensitive particles dispersed in a solid waxy matrix is placed on the transparent electrode. A sheet of baryta paper is then placed on the imaging layer. Baryta paper is a paper coated with a suspension of barium sulfate in a gelatin. The second conductive electrode is then placed in contact with the back, i.e., uncoated, surface of the baryta sheet. The combination of baryta paper and the conductive electrode will hereafter be referred to as the blocking electrode. One or both of the electrodes is then heated by application of AC voltage until the waxy matrix of the imaging layer has liquified allowing the particles to migrate. A DC voltage is then applied across the imaging layer while the imaging layer is exposed to imagewise activating electromagnetic radiation which causes particle migration in imagewise configuration. The blocking electrode is then removed from the system providing a negative image on one of the electrodes and a positive image on the other electrode.

Conventionally, the image formed on the surface of the injecting electrode, here, the conductive transparent electrode, is transferred to a receiving sheet and fixed thereon for further use and viewing. However, since a negative image is formed on one of the electrodes and a positive image is formed on the other, it is possible to use either image. The image may be fixed in place by cooling. In addition, a lamination may be placed over the image to protect the soft waxy matrix against abrasion or scratching. The image may also be transferred from the electrode and fixed on another surface so that the electrode may be reused. Such a transfer step may be carried out by adhesive pickoff with an adhesive tape such as Scotch brand cellophane or preferably, by electrostatic field transfer. Electrostatic transfer may, for example, be accomplished by carrying out the imaging procedure described and then passing a conductive roller over the particle image formed on the injecting electrode, holding the roller at a potential opposite in polarity to that of the first electrode. If the transfer roller is covered with a paper sleeve, this paper will pick up the complete image as the electrode rolls over the injecting electrode.

It is preferred, however, to coat the imaging layer on the surface of a transparent material such as, for example, cellophane. The cellophane substrate prevents contact of the imaging layer with the relatively expensive transparent conductive electrode eliminating the need to clean the conductive transparent electrode. In addition, the image formed on the surface of the cellophane may be used directly without further transfer.

The surface of the blocking electrode and the transfer electrode may be of any suitable insulating material. Typical materials include baryta paper, cellulose acetate, polyethylene coated paper, cellophane, nitrocellulose, polystyrene, polytetrafluoroethylene, polyvinylfluoride, polyethylene terephthalate, and mixtures thereof. Baryta paper is preferred because it is relatively inexpensive and is readily available.

Any suitable transparent conductive electrode material may be used. Typical conductive transparent electrode materials include: conductive glass such as tin or indium oxide coated glass, aluminum coated glass, or similar coatings on plastic substrates. Nesa, a glass coated with tin oxide, is preferred because of its high transparency and because it is readily available.

The second electrode may be made of any conductive electrode material. Typical conductive electrode materials include: metal surfaces such as aluminum, brass, stainless steel, copper, nickel, zinc, conductively coated glass, such as tin or indium oxide coated glass, aluminum coated glass, similar coatings on plastic substrates, rubber rendered conductive by inclusion of a suitable material therein, or paper rendered conductive by inclusion of a suitable chemical therein, or through conditioning in a humid atmosphere to insure the presence therein of sufficient water content to render the material conductive. Aluminum is preferred because it is an excellent conductor and is readily available.

It is possible in accordance with this invention to provide an electrophoretic imaging system which does not require two conductive electrodes. For example, the imaging layer could be coated on an insulating flexible member such as a sheet of Mylar, a polyester available from E. I. du Pont. The uncoated surface of the insulating member in this system would then be uniformly charged. The coated insulating material would then be placed on a conductive grounded electrode with the imaging layer in contact with the electrode providing a field across the imaging layer. The imaging layer would then be heated and exposed to imagewise activating electromagnetic radiation through either the insulating member or the conductive electrode resulting in particle migration in image configuration. The insulating member may be charged by any conventional charging devices, for example, corona discharge devices such as those described in U.S. Pat. No. 2,588,699 to Carlson, U.S. Pat. No. 2,777,957 to Walkup, U.S. Pat. No. 2,885,556 to Gundlach, or by using conductive rollers as described in U.S. Pat. No. 2,980,834 to Tregay et al., or by frictional means as described in U.S. Pat. No. 2,297,691 to Carlson or other suitable apparatus.

Any suitable highly colored particle or mixtures of such particles may be used in carrying out the invention, regardless of whether the particular particle selected is organic, inorganic and is made up of one or more components in solid solution or dispersed one in the other or whether the particles are made up of multiple layers of different materials or are combinations of photosensitive and non-photosensitive materials. Typical materials include photoconductors such as: substituted and unsubstituted phthalocyanine; quinacridones; zinc oxide; mercuric sulfide; Algol Yellow (C.I. No. 67,300); cadmium sulfide; cadmium selenide; Indofast brilliant scarlet (C.I. No. 71,140); zinc sulfide; selenium; antimony sulfide; mercuric oxide; indium trisulfide; titanium dioxide; arsenic sulfide; $Pb_3O_4$; gallium triselenide; zinc cadmium sulfide; lead iodide; lead selenide; lead sulfide; lead telluride; lead chromate; gallium telluride; mercuric selenide; and the iodides, sulfides, selenides and tellurides of bismuth, aluminum and molybdenum. Organic photoconductors, including those complexed with small amounts (up to about 5%) of suitable Lewis acids, such as:

4,5-diphenylimidazolidinone;
4,5-diphenylimidazolidinethione;
4,5-bis-(4'-amino-phenyl)-imidazolinone
1,5-cyanonaphthalene;
1,4-dicyanonaphthalene;
aminophthalodinitrile;
nitrophthalidinitrile;
1,2,5,6-tetraazacyclooctatetraene-(2,4,6,8);
3,4-di-(4'-methoxy-phenyl)-7,8-diphenyl-1,2,5,6-tetraazacyclooctatetraene-(2,4,6,8);
3,4-di-(4'-phenoxyphenyl-7,8-diphenyl-1,2,5,6-tetraazacycloctatetraene-(2,4,6,8);
3,4,7,8-tetramethoxy-1,2,5,6-tetraazacyclooctatetraene-(2,4,6,8);
2-mercaptobenzthiazole;
2-phenyl-4-diphenylidene-oxazolone;
2-phenyl-4-methoxy-benzylidene-oxazolone;
6-hydroxy-2-phenyl-3-(p-dimethylaminophenyl)-benzofurane;
6-hydroxy-2,3-di-(p-methoxy-phenyl)-benzofurane;
6-hydroxy-2,3-di-(p-methoxyphenyl)-benzofurane;
2,3,5,6-tetra-(p-methoxyphenyl)-furo-(3,2f)-benzofurane;
4-dimethylamino-benzylidene-benzhydrazide;
4-dimethylamino-benzylidene-isonicotinic acid hydrazide;
furfurylidene-(2)-4'-methylamino-benzhydrazide;
5-benzylidene-amino-acenaphthene;
3-benzylidene-amino-carbazole;
(4-N,N-dimethylamino-benzylidene)-p-N,N-dimethylaminoaniline;
(2-nitro-benzylidene)-p-bromo-aniline;
N,N-dimethyl-N'-(2-nitro-4-cyano-benzylidene)-p-phenylene-diamine;
2,4-diphenyl-quinazoline;
2-(4'-aminophenyl)-4-phenyl-quinazoline;
2-phenyl-4-(4'-dimethylaminophenyl)-7-methoxy-quinazoline;
1,3-diphenyl-tetrahydroimidazole;
1,3-di-(4'-chlorophenyl-tetrahydroimidazole;
1,3-diphenyl-2-4'-dimethylaminophenyl)-tetrahydroimidazole;
1,3-di-(p-tolyl)-2-[quinolyl-(2')]-tetrahydroimidazole;
3-(4'-dimethylaminophenyl)-5-(4'''-methoxyphenyl-6-phenyl-1,2,4-triazine;
3-pyridil-(4')-5-(4'''-dimethylaminophenyl)-6-phenyl-1,2,4-triazine;
3,(4'-aminophenyl)-5,6-diphenyl-1,2,4-triazine;
2,5-bis[4'-aminophenyl-(1')]-1,3,4-triazole;
2,5-bis[4'-(N-ethyl-N-acetyl-amino)-phenyl-(1')]-1,3,4-triazole;
1,5-diphenyl-3-methyl-pyrazoline;
1,3,4,5-tetra-phenyl-pyrazoline;
1-methyl-2-(3',4'-dihydroxymethylenephenyl)-benzimidazole;
2-(4'-dimethylaminophenyl)-benzoxazole;
2-(4'-methoxyphenyl)-benzthiazole;
2,5-bis-[p-aminophenyl-(1)]-1,3,4-oxidiazole;
4,5-diphenyl-imidazolone;
3-aminocarbazole;
copolymers and mixtures thereof.

Any suitable Lewis acid (electron acceptor) may be employed under complexing conditions with many of the aforementioned more soluble organic materials and also with many of the more insoluble organics to impart very important increases in photosensitivity to those materials.

Typical Lewis acids are 2,4,7-trinitro-9-fluorenone;
2,4,5,7-tetranitro-9-fluorenone;

picric acid;
1,3,5-trinitro-benzene chloranil;
benzoquinone;
2,5-dichlorobenzoquinone;
2,6-dichlorobenzoquinone;
chloranil;
naphthoquinone-(1,4);
2,3-dichlor-naphthoquinone-(1,4);
anthraquinone;
2-methyl-anthraquinone;
1,4-dimethyl-anthraquinone;
1-chloroanthraquinone;
anthraquinone-2-carboxylic acid;
1,5-dichloroanthraquinone;
1-chloro-4-nitroanthraquinone;
phenanthrene-quinone;
acenaphthenequinone;
pyranthrenequinone;
chrysene-quinone;
thionaphthenequinone;
anthra-quinone-1,8-disulfonic acid; and
anthraquinone-2-aldehyde;
triphthaloyl-benzene-aldehydes such as bromal, 4-nitro-benzaldehyde;
2,6-dichlorobenzaldehyde-2, ethoxy-1-naphthaldehyde;
anthracene-9-aldehyde;
pyrene-3-aldehyde;
oxindole-3-aldehyde;
pyridine-2, 6-dialdehyde, biphenyl-4-aldehyde;
organic phosphonic acids such as 4-chloro-3-nitro-benzene-phosphonic acid;
nitrophenols, such as 4-nitrophenol and picric acid;
acid anhydrides, for example,
acetic-anhydride, succinic anhydride, maleic anhydride;
phthalic anhydride, tetrachlorophthalic anhydride;
perylene 3,4,9,10-tetracarboxylic acid and
chrysens-2,3,8,9-tetracarboxylic anhydride;
dibromo maleic acid anhydride;
metal-halides of the metals and metalloids of the Groups I-B, II through to Group VIII of the Periodical System, for example: aluminum chloride, zinc chloride, ferric chloride tin tetrachloride (stannic chloride); arsenic trichloride; stannous chloride; antimony pentachloride, magnesium chloride, magnesium bromide, calcium bromide, calcium iodide, strontium bromide, chromic bromide, manganous chloride, cobaltous chloride, cobaltic chloride, cupric bromide, ceric chloride, thorium chloride; arsenic tri-iodide; boron halide compounds, for example:
boron trifluoride and boron trichloride;
and ketones such as
acetophenone benzophenone;
2-acetyl-naphthalene;
benzil;
benzoin;
5-benzoyl acenaphthene, biacene-dione,9-acetylanthracene, 9-benzoyl-anthracene;
4-(4-dimethylamino-cinnamoyl)-1-acetylbenzene;
acetoacetic acid anilide;
indiandione-(1-3),-(1-3-diketo hydrindene);
acenaphthene quinone-dichloride;
anisil, 2,2-pyridil;
furil;
mineral acids such as the hydrogen halides, sulphuric acid and phosphoric acid;
organic carboxylic acids; such as
acetic acid and the substitution products thereof;
monochloro-acetic acid;
dichloro-acetic acid;
trichloro-acetic acid;
phenylacetic acid; and
6-methyl-coumarinylacetic acid (4);
maleic acid, cinnamic acid;
benzoic acid;
1-(4-diethyl-amino-benzoyl)-benzene-2-carboxylic acid;
phthalic acid; and
tetrachlorophthalic acid;
alpha-beta-di-bromo-beta-formyl-acrylic acid (muco-bromic acid);
dibromo-maleic acid;
2-bromo-benzoic acid;
gallic acid;
3-nitro-2-hydroxyl-1-benzoic acid;
2-nitro phenoxy-acetic acid, 2-nitro-benzoic acid;
3-nitro benzoic acid;
4-nitro-benzoic acid;
3-nitro-4-ethoxy-benzoic acid;
2-chloro-4-nitro-1-benzoic acid;
3-nitro-4-methoxy-benzoic acid;
4-nitro-1-methyl-benzoic acid;
2-chloro-5-nitro-1-benzoic acid;
3-chloro-6-nitro-1-benzoic acid;
4-chloro-3-nitro-1-benzoic acid;
5-chloro-3-nitro-2-hydroxy-benzoic acid;
4-chloro-2-hydroxy-benzoic acid;
2,4-dinitro-1-benzoic acid;
2-bromo-5-nitro-benzoic acid;
4-chloro-phenyl-acetic acid;
2-chloro-cinnamic acid;
2-cyano-cinnamic acid;
2,4-dichlorobenzoic acid;
3,5-dinitrobenzoic acid;
3,5-dinitro-salycylic acid;
malonic acid;
mucic acid;
acetosalycylic acid;
benzilic acid;
butane-tetra-carboxylic acid;
citric acid;
cyano-acetic acid;
cyclo-hexane-dicarboxylic acid;
cyclo-hexane-carboxylic acid;
9,10-dichloro-stearic acid;
fumaric acid;
itaconic acid;
levulinic acid;
(levulic acid);
malic acid;
succinic acid;
alpha-bromo-stearic acid;
citraconic acid;
dibromo-succinic acid;
pyrene-2,3,7,8-tetra-carboxylic acid;
tartaric acid;
organic sulphonic acid, such as 4-toluene sulphonic acid; and
benzene sulphonic acid;
2,4-dinitro-1-methyl-benzene-6-sulphonic acid;
2,6-dinitro-1-hydroxy-benzene 4-sulphonic acid
and mixtures thereof.

In addition, other photoconductors may be formed by complexing one or more suitable Lewis acids with aromatic polymers which are ordinarily not thought of as photoconductors. Typical aromatic polymers include the following illustrative materials: polyamides, polyimides, polycarbonates, epoxy resins, phenoxy resins, aromatic silicone resins, polyphenylene oxide, polysulfones, melamine resins, phenolic resins, and mixtures and copolymers thereof where applicable.

Phthalocyanines are preferred because of their high sensitivity and excellent color. Of the phthalocyanines alpha and "x" forms of metal free phthalocyanine have given optimum results. However, any other suitable phthalocyanine may be used where desired. Any suitable phthalocyanine may be used to prepare the photoconductive layer of the present invention. The phthalocyanine used may be in any suitable crystal form. It may be substituted or unsubstituted both in the ring and straight chain portions. Reference is made to a book entitled "Phthalocyanine Compounds" by F. H. Moser and A. L. Thomas, published by the Reinhold Publishing Company, 1963 edition for a detailed description of phthalocyanines and their synthesis. Any suitable phthalocyanine may be used in the present invention. Phthalocyanines encompassed within this invention may be described as compositions having four isoindole groups linked by four nitrogen atoms in such a manner so as to form a conjugated chain, said compositions have the general formula $(C_8H_4N_2)_4R_n$ wherein R is selected from the group consisting of hydrogen, deuterium, lithium, sodium, potassium, copper, silver, beryllium, magnesium, calcium, zinc, cadmium, barium, mercury, aluminum, gallium, indium, lanthanum, neodymium, samarium, europium, gadolinium, dysprosium, holmium, erbium, thylium, ytterbium, lutecium, titanium, tin, hafnium, lead, silicon, germanium, thorium, vanadium, antimony, chromium, molybdenum, uranium, manganese, iron, cobalt, nickel, rhodium, palladium, osmium, and platinum; and $n$ is a value of greater than 0 and equal to or less than 2. Any other suitable phthalocyanines such as ring or aliphatically substituted metallic and/or non-metallic phthalocyanines may also be used if suitable.

Typical phthalocyanines are:

aluminum phthalocyanine, aluminum polychlorophthalocyanine,
antimony phthalocyanine, barium phthalocyanine,
beryllium phthalocyanine, cadmiuum hexadecachlorophthalocyanine,
cadmium phthalocyanine, calcium phthalocyanine,
cerium phthalocyanine, chromium phthalocyanine,
cobalt phthalocyanine, cobalt chlorophthalocyanine,
copper 4-aminophthalocyanine, copper bromochlorophthalocyanine,
copper 4-chlorophthalocyanine, copper 4-nitrophthalocyanine,
copper phthalocyanine, copper phthalocyanine sulfonate,
copper polychlorophthalocyanine, deuterio-phthalocyanine,
dysprosium phthalocyanine, erbium phthalocyanine,
europium phthalocyanine, gadolinium phthalocyanine,
gallium phthalocyanine, germanium phthalocyanine,
hafnium phthalocyanine, halogen substituted phthalocyanine,
holmium phthalocyanine, indium phthalocyanine, iron phthalocyanine,
iron polyhalophthalocyanine, lanthanum phthalocyanine,
lead phthalocyanine, lead polychlorophthalocyanine,
cobalt hexaphenylphthalocyanine, copper pentaphenylphthalocyanine,
lithium phthalocyanine, lutecium phthalocyanine,
magnesium phthalocyanine, manganese phthalocyanine,
mercury phthalocyanine, molybdenum phthalocyanine,
naphthalocyanine, neodymium phthalocyanine, nickel phthalocyanine,
nickel polyhalophthalocyanine, osmium phthalocyanine,
palladium phthalocyanine, palladium chlorophthalocyanine,
alkoxyphthalocyanine, alkylaminophthalocyanine, alkylmercaptophthalocyanine,
aralkylaminophthalocyanine, aryloxyphthalocyanine,
arylmercaptophthalocyanine, copper phthalocyanine piperidine,
cycloalkylaminophthalocyanine, dialkylaminophthalocyanine,
diaralkylaminophthalocyanine, dicycloalkylaminophthalocyanine
hexadecahydrophthalocyanine, imidomethylphthalocyanine,
1,2-naphthalocyanine, 2,3-naphthalocyanine, octaazaphthalocyanine,
sulfur phthalocyanine, tetraazaphthalocyanine, tetra-4-acetylaminophthalocyanine,
tetra-4-aminobenzoylphthalocyanine, tetra-4-aminophthalocyanine,
tetrachloromethylphthalocyanine, tetradiazophthalocyanine,
tetra-4,4-dimethyloctaazaphthalocyanine, tetra-4,5-diphenylenedioxide phthalocyanine,
tetra-4,5-diphenyloctaazaphthalocyanine, tetra-(6-methylbenzothiazoyl) phthalocyanine,
tetra-p-methylphenylaminophthalocyanine, tetramethylphthalocyanine,
tetra-naptho-triazolylphthalocyanine, tetra-4-naphthylphthalocyanine,
tetra-4-nitrophthalocyanine, tetra-perinaphthylene-4,5-octaazaphthalocyanine,
tetra-2,3-phenyleneoxide phthalocyanine, tetra-4-phenyloctaazaphthalocyanine,
tetraphenylphthalocyanine, tetraphenylphthalocyanine tetracarboxylic acid,
tetraphenylphthalocyanine tetrabarium carboxylate,
tetraphenylphthalocyanine tetra-calcium carboxylate,
tetrapyridyphthalocyanine, tetra-4-trifluoromethylmercaptophthalocyanine,
tetra-4-trifluoromethylphthalocyanine, 4,5-thionaphtheneoctaazaphthalocyanine,
platinum phthalocyanine, potassium phthalocyanine,
rhodium phthalocyanine, samarium phthalocyanine,
silver phthalocyanine, silicone phthalocyanine, sodium phthalocyanine,
sulfonated phthalocyanine, thorium phthalocyanine,
thulium phthalocyanine, tin chlorophthalocyanine,
tin phthalocyanine, titanium phthalocyanine, uranium phthalocyanine,
vanadium phthalocyanine, ytterbium phthalocyanine,
zinc chlorophthalocyanine, zinc phthalocyanine, others described in the Moser text and mixtures, dimers, trimers, oligomers, polymers, copolymers or mixtures thereof.

It is also to be understood in connection with the heterogeneous system, that the photoconductive particles themselves may consist of any suitable one or more of the aforementioned photoconductors, either organic or inorganic, dispersed in, in solid solution in, or copolymerized with, any suitable insulating resin whether or not the resin itself is photoconductive. This particular type of particle may be particularly desirable to facilitate dispersion of the particle, to prevent undesirable reactions between the binder and the photoconductor or between the photoconductor and the activator and for similar purposes. Typical resins include polyethylene, polypropylene, polyamides, polymethacrylates, polyacrylates, polyvinyl chlorides, polyvinyl acetates, polystyrene, polysiloxanes, chlorinated rubbers, polyacrylonitrile, epoxies, phenolics, hydrocarbon resins and other natural resins such as rosin derivatives as well as mixtures and copolymers thereof.

Where a monochromatic image is to be formed, the particles will be of a single color. Where polychromatic images are to be formed, particles of two or more colors may be used. For example, for subtractive color formation the particles will ordinarily be magenta, cyan and yellow.

The wax or wax-like binder matrix may be of any suitable material. Typical wax materials are: animal waxes such as spermaceti, beeswax, stearic acid, Chinese wax, vegetable waxes such as carnauba, Japan, bayberry, candelilla, mineral waxes such as ozocerite, montan, ceresin, paraffin, synthetic waxes such as medium weight polyethylene, polyethylene glycols, polyoxyethylene esters, chloronaphthalenes, sorbitols, chlorotrifluoroethylene resins, microcrystalline waxes and mixtures thereof. Bioloid, a paraffin wax, is preferred because of its chemical purity and availability.

BRIEF DESCRIPTION OF DRAWINGS

The advantages of this improved system of electrophoretic imaging will become apparent upon consideration of the detailed disclosure of the invention, especially, when taken in conjunction with the accompanying drawings, wherein:

Referring now to FIG. 1, the imaging layer generally designated 1 comprising photosensitive particles 3 dispersed in an insulating wax-like binder material 5 is coated on transparent conductive substrate 7. Imaging layer 1 and substrate 7 are then placed on Nesa electrode 9. Blocking electrode generally designated 15 comprises a sheet of insulating flexible material 11 placed on the surface of conductive roller 13. A source of AC potential 17 is connected to the conductive surface of electrode 9 and ground. A source of DC potential 19 is connected to electrodes 15 and 9 and ground.

Figure 1:
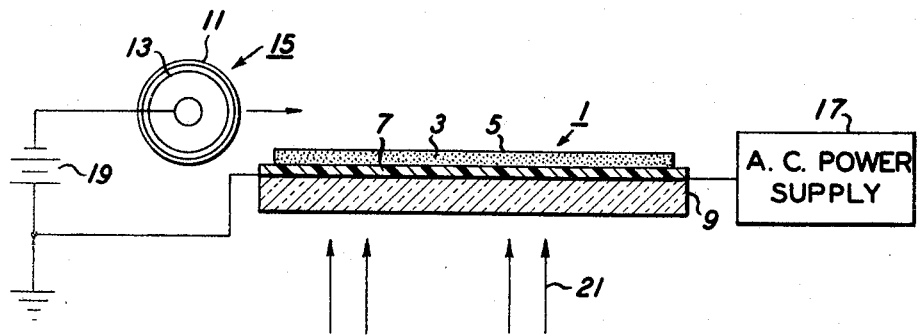
FIG. 1 shows a sectional side view of a simple exemplary system for carrying out the process of this invention wherein two conductive electrodes are used.

The AC power supply is activated heating the electrode 9 which melts binder 5. Imaging layer 1 is then exposed to activating electromagnetic radiation 21 in image configuration. Potential source 19 is activated and electrode 15 is rolled across imaging layer 1 applying a potential across imaging layer 1. The photosensitive particles migrate to sheet 11 and sheet 7 in image configuration as the electrode 15 rolls across imaging layer 1. Power supplies 17 and 19 are then disconnected. Electrode 15 and sheet 7 are separated while binder 5 is still in a molten state. Visible images are found formed on the surface of sheet 11 and sheet 7.

As is obvious from the above, it is not necessary to have sheet 7 placed on electrode 9. However, it is preferred to do so to keep the relatively expensive transparent conductive electrode 9 clean. In the case where sheet 7 is not placed on sheet 9, the image may be removed from electrode 9 by means of a transfer roller. The transfer may be accomplished by, for example, adhesive pick-up or by passing a roller across the electrode held at a potential opposite to that of the blocking electrode.

Figure 2:
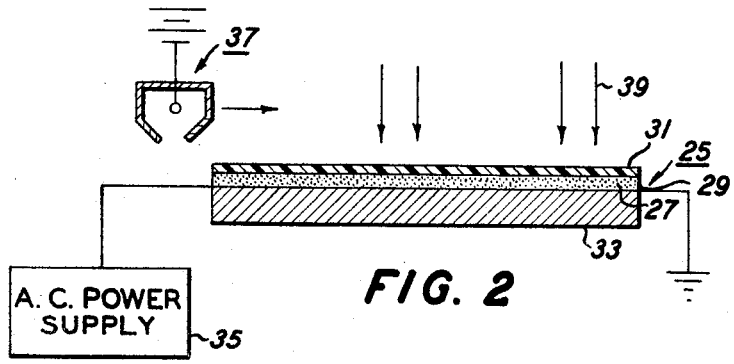
FIG. 2 shows a sectional side view of a simple exemplary system for carrying out the process of this invention wherein a single conductive electrode is used.

Referring now to FIG. 2, imaging layer generally designated 25 comprising photosensitive particles 27 dispersed in a wax-like insulating binder 29 are coated on the surface of an insulating flexible sheet 31. Coated sheet 31 is then placed so that its coated side is against conductive electrode 33. A source of AC power 35 is connected to the conductive electrode and activated to heat the electrode thereby melting the wax-like binder 29. A source of corona 37 is then moved across the back surface of sheet 31 forming a uniform electrostatic charge on the back of insulating sheet 31. It is not essential that binder 29 be molten before insulating sheet 31 is charged, for example, the corona charging may be carried on before the coated sheet 31 is placed in contact with electrode 33. The electrostatic charge on the back of insulating sheet 31 results in field application across imaging layer 25 to grounded electrode 33. Imaging layer 25 is then exposed to a pattern of activating electromagnetic radiation 39. Application of field and exposure to activating electromagnetic radiation causes photosensitive particles 27 to migrate in image configuration. Sheet 31 and electrode 33 are then separated, resulting in visible images on sheet 31 and on electrode 33. It is obvious that a conductive transparent sheet may be placed between the imaging layer 25 and conductive electrode 33 to prevent deposition of a migration image on the surface of conductive electrode 33.

Figure 3:
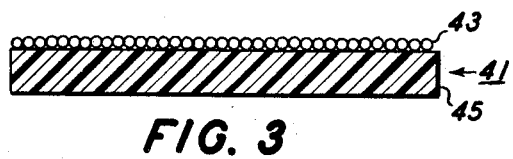
FIG. 3 shows a sectional side view of an alternative embodiment for the imaging layer.

Referring now to FIGURE 3, an alternative embodiment of imaging layer 41 is shown wherein photosensitive particles 43 have been electrophoretically deposited on the surface of waxy binder 45.

DESCRIPTION OF PREFERRED EMBODIMENTS

The following examples further specifically illustrate the present invention. The examples below are intended to illustrate the various preferred embodiments of the improved imaging method. The parts and percentages are by weight unless otherwise indicated.

EXAMPLE I

A commercial metal-free phthalocyanine is first purified by o-dichlorobenzene extraction to remove organic impurities. This extraction step yields the beta crystalline form of phthalocyanine. Approximately 10 grams of the beta phthalocyanine is then mixed into about 100 cc. of petroleum ether (B.P. 90–120° C.). Approximately 20 grams of Bioloid wax, having a melting point between 122–126° F., a paraffin wax available as Bioloid paraffin wax from the Will Scientific Company, is dissolved in the petroleum ether containing the photosensitive pigment. The mixture is then ball milled for about 30 hours. The milled mixture is then coated on the conductive surface of a Nesa glass substrate using a number 10 wire wound coating rod which provides an imaging layer thickness dry of about 10 microns. The coating is then dried in air. A baryta sheet is then placed so that its coated side is in contact with the imaging layer. An aluminum plate is then placed over the baryta paper. One end of the conductive Nesa glass surface is grounded; the other end is connected to a potential source of 20 volts AC. The potential is applied until the binder layer becomes molten. A potential source of 3000 volts DC is then applied across the imaging layer by connecting the negative terminal of the power supply to the aluminum plate and the positive terminal to the grounded Nesa surface. Application of AC voltage may be continued during the time the DC voltage is applied since the small AC voltage does not interfere with the field across the imaging layer. The imaging layer is then exposed to a pattern of light and shadow through the Nesa glass electrode. An exposure of about 60 foot-candles for 5 seconds resulting in a total imagewise exposure of about 300 foot-candle-seconds is used. The baryta paper and conductive electrode are then removed from the system yielding a negative image on the surface of the baryta paper and a positive image on the surface of the Nesa glass. The positive image is then transferred by adhesive pick-up. The image is of good quality and is blue-green in color.

EXAMPLE II

About 7 grams of Monolite Fast Blue G.S., the alpha form of metal-free phthalocyanine, C.I. No. 74,100, available from the Arnold Hoffman Company, is mixed in with about 100 cc. of petroleum ether. Approximately 10 grams of Sunoco wax 5825, a microcrystalline wax available from Sunoco, is dissolved in the petroleum ether containing the photosensitive pigment. The mixture is then ball milled for about 35 hours. The milled mixture is then coated on a transparent conductive sheet of cellophane using a No. 16 wire wound coating rod which provides an imaging layer thickness dry of about 15 microns. The coating is dried on a hot plate held at 140° F. The coated cellophane is then placed with the coated side up on the conductive surface of a Nesa glass plate. A sheet of polyethylene coated paper, available from Crocker Hamilton Paper Company, is placed coated side down on the imaging layer. An aluminum plate is then placed over the polyethylene coated paper. One end of the conductive Nesa glass surface is grounded; the other end is connected to a potential source of 30 volts AC. Potential is applied until the binder layer becomes molten. A potential source of 2500 volts DC is then applied across the imaging layer by connecting the negative terminal of the power supply to the aluminum plate and the positive terminal to the grounded Nesa surface. The imaging layer is then exposed to a pattern of light and shadow through the Nesa glass electrode. An exposure of about 15 foot-candles for 10 seconds resulting in a total imagewise exposure of about 150 foot-candle-seconds is used. The polyethylene coated paper and aluminum electrode are then removed from the system yielding a negative image on the surface of the polyethylene coated paper and a positive image on the surface of the cellophane. The positive image is then used for viewing. The image is of good quality and is blue in color.

EXAMPLE III

A commercial metal-free phthalocyanine is first purified by o-dichlorobenzene extraction to remove organic impurities. This extraction step yields the beta crystalline form of phthalocyanine. Approximately 5 grams of the beta phthalocyanine is then mixed into about 100 cc. of petroleum ether. Approximately 10 grams of halocarbon wax 6–00, a halocarbon plastic available from Halocarbon Products Corporation, is dissolved in the petroleum ether containing the photosensitive pigment. The mixture is then ball milled for about 40 hours. The milled mixture is then coated on a transparent conductive sheet of cellophane using a No. 10 wire wound coating rod which provides an imaging layer thickness dry of about 7 microns. The coating is then dried on a hot plate held at a temperature of about 130° F. The coated cellophane is then placed with the coated side up on the conductive surface of a Nesa glass plate. A polyethylene coated sheet is then placed on the coated cellophane so that its coated side is in contact with the imaging layer. An aluminum plate is then placed over the polyethylene coated paper. One end of the conductive Nesa glass surface is grounded; the other end is connected to a potential source of 40 volts AC. The potential is applied until the binder layer becomes molten. A potential source of 2,000 volts DC is then applied across the imaging layer by connecting the negative terminal of the power supply to the aluminum plate and the positive terminal to the grounded Nesa surface. The imaging layer is then exposed to a pattern of light and shadow through the Nesa glass electrode. An exposure of about 60 foot-candles for about 10 seconds resulting in a total imagewise exposure of about 600 foot-candles-seconds is used. The polyethylene paper and cellophane is then separated yielding a negative image on the surface of the polyethylene coated paper and a positive image on the surface of the cellophane sheet. The positive image is then viewed directly. The image is of fair quality and is blue-green in color.

EXAMPLE IV

Approximately 2.0 grams of Algol Yellow G.C., 1,2,5,6 - di(C,C' - diphenyl)-thiazole-anthraquinone, C.I. No. 67,300, available from General Dyestuffs, approximately 1.5 grams of Monolite Fast Blue G.S., and approximately 1.5 grams of Watchung Red B, a barium salt of 1 - (4' - methyl - 5'-chloroazobenzene-2'-sulfonic acid), 2-hydroxy-3-napthoic acid, C.I. No. 15865, available from Du Pont, are mixed in about 100 grams of petroleum ether. Approximately 40 grams of Silgon Wax PM–1061, available from Stauffer Chemical Company, is dissolved in the petroleum ether containing the photosensitive pigment. The mixture is then ball milled for 30 hours. The milled mixture is then coated on a transparent conductive sheet of cellophane using a No. 12 wire wound coating rod which provides an imaging layer thickness dry of about 10 microns. The coating is then dried in air. The coated cellophane is then placed with the coated side up on the conductive surface of a Nesa glass plate. A polyethylene coated sheet is placed coated side out on a conductive aluminum roller having a diameter of about 1 inch. One end of the conductive Nesa glass surface is grounded; the other end is connected to a potential source of 30 volts AC. The potential is applied until the binder layer becomes molten. A potential source of −4,000 volts DC is then applied across the imaging layer by connecting the negative terminal of the power supply to the aluminum roller and the positive terminal to the grounded Nesa surface, and rolling the roller across the surface of the imaging layer while the imaging layer is exposed to a Kodachrome transparency through the Nesa glass electrode. An exposure of about 500 foot-candles is used. The roller is moved across the imaging layer at a rate of about 1½ inches per second. The polyethylene paper and cellophane are then separated yielding a positive full color image on the surface of the cellophane sheet. The positive image is then viewed directly. The image is of good quality with the colors of the original properly reproduced.

EXAMPLE V

Approximately 5 grams of Monolite Fast Blue is mixed in approximately 100 cc. of petroleum ether. Approximately 10 grams of halocarbon wax 8–00, a halocarbon plastic available from Halocarbon Products Corporation, is dissolved in the petroleum ether containing the photosensitive pigment. The mixture is then ball milled for about 35 hours. The milled mixture is then coated on a transparent insulating sheet of Mylar. The coating is then dried on a hot plate held at a temperature of about 150° F. The Mylar sheet is then placed on a Nesa glass conductive surface so that the imaging layer is in contact with the Nesa glass plate. One end of the conductive Nesa glass surface is grounded; the other end is connected to a potential source of about 35 volts AC. The AC potential is applied until the binder layer becomes molten. The back side of the Mylar sheet is then corona charged by a discharge device held at a potential of about −7,000 volts. The imaging layer is then exposed to a pattern of light and shadow through the Nesa glass electrode. An exposure of about 250 foot-candles for about 10 seconds resulting in a total imagewise exposure of about 2,500 foot-candle-seconds is used. The Mylar sheet is then stripped from the Nesa glass plate yielding a negative image on the surface of the Mylar and a positive image on the surface of the Nesa glass plate. The image is then transferred by adhesive transfer. The image is then viewed directly. The image is of fair quality and is blue in color.

EXAMPLE VI

Approximately 2.0 grams of Algol Yellow G. C., approximately 1.5 grams of Monolite Fast Blue, and approximately 1.5 grams of Watchung Red B are mixed in approximately 75 milliliters of petroleum ether. Approximately 10 grams of Sunoco wax 342 (M.P. 57° C.), a paraffin wax available from Sunoco, is dissolved in the petroleum ether containing the photosensitive pigments. The mixture is then ball milled for about 40 hours. The milled mixture is then coated on a transparent insulating sheet of Mylar using a No. 12 wire wound coating rod which provides an imaging dry layer thickness of about 10 microns. The coating is then dried on a hot plate held at a temperature of about 130° F. The imaging layer is imaged as in Example IV except that the exposure is 250 foot-candles. The image is then transferred by adhesive pickup. The image is of good quality with the colors of the original reproduced.

EXAMPLE VII

Approximately 5 grams of o-dichlorobenzene purified Monolite Fast Blue is mixed with 75 grams of petroleum ether and 2 grams light paraffin oil (SG 0.845–0.860). Approximately 8 grams of Bioloid paraffin wax is dissolved in the petroleum ether containing the photosensitive pigments. The mixture is then ball milled for about 48 hours. The milled mixture is then coated on a transparent conductive sheet of 3 mil raw cellophane using a No. 12 wire wound rod. The coating is air dried. The coated cellophane is then placed with the coated side up on the conductive surface of a Nesa glass plate. A baryta coated sheet is then placed on the coated cellophane so that its coated side is in contact with the imaging layer. An aluminum plate is then placed over the baryta coated paper. The Nesa glass surface is grounded. A potential source of 4,000 volts DC is then applied across the imaging layer by connecting the negative terminal of the power supply to the aluminum plate and the positive terminal to the grounded Nesa surface. A stream of heated air is directed at the surface of the Nesa plate by means of a Manco heat-gun to soften the binder layer. The imaging layer is then exposed to a pattern of light and shadow through the Nesa glass electrode. An exposure of 60 foot-candles for about 5 seconds resulting in a total imagewise exposure of about 300 foot-candle-seconds is used. The baryta paper and cellophane are separated yielding a negative image on the surface of the baryta coated paper and a positive image on the surface of the cellophane sheet. The DC potential is then terminated. The positive image is then viewed directly. The image is of good quality and is blue in color.

EXAMPLE VIII

The experiment of Example VII is repeated. The β-phthalocyanine, however, is replaced with 5 grams of Watchung Red B milled in the liquid ratios given in Example VII. The exposure is about 250 foot-candles for 5 seconds resulting in total exposure of about 1250 foot-candle-seconds. The image is of good quality and is red in color.

EXAMPLE IX

Example VII is repeated except that the β-phthalocyanine is replaced with 2.0 grams of Algol Yellow, 1.5 grams of Monolite Fast Blue and 1.5 grams Watchung Red B. An exposure of about 500 foot-candles is used. The image layer is exposed through a Kodachrome transparency. The image is of good quality with the colors of the original Kodachrome properly reproduced.

EXAMPLE X

Approximately 10 grams of Bonadur Red B, 1-(4'-ethyl-5'-chloroazobenzene-2'-sulfonic acid)-2-hydroxy-3-naphthoic acid, calcium lake available from American Cyanamid, is mixed into about 100 cc. of petroleum ether (B.P. 90–120° C.). Approximately 20 grams of Bioloid wax, a paraffin wax available as Bioloid paraffin wax from the Will Scientific Company, having a melting point between 122 and 126° F., is dissolved in the petroleum ether containing the photosensiitve pigment. The mixture is then ball milled for about 35 hours. The milled mixture is then coated on the conductive surface of a Nesa glass substrate using a number 10 wire wound coating rod which provides a dry imaging layer of about 10 microns. The coating is then dried in air. A baryta sheet is then placed so that its coated side is in contact with the imaging layer. An aluminum plate is then placed over the baryta paper. ne end of the conductive Nesa glass surface is grounded; the other end is connected to a potential source of 35 volts AC. The potential is applied until the binder layer becomes molten. A potential source of 3,000 volts DC is then applied across the imaging layer by connecting the negative terminal of the power supply to the aluminum plate and the positive terminal to the grounded Nesa conductive surface. Application of AC voltage may be continued during the time the DC voltage is applied since the small AC voltage does not interfere with the field across the imaging layer. The imaging layer is then exposed to the pattern of light and shadow through the Nesa glass electrode. An exposure of about 60 foot-candles for 10 seconds resulting in a total imagewise exposure of 600 foot-candle-seconds is used. The baryta paper and conductive electrode are then removed from the system yielding a negative image on the surface of the baryta paper and a positive image on the surface of the Nesa glass. The positive image conforms to the original and is blue-red in color.

EXAMPLE XI

The experiment of Example X is repeated except that the 10 grams of Bonadur Red B is replaced with 10 grams of Naphthol Red B, C.I. No. 12355, 1-(2'-methoxy-5'-nitrophenylazo)-2-hydroxy-3"-nitro-3-naphthanilide available from Collway Colors. The image on the Nesa glass conforms to the original and is blue-red in color.

EXAMPLE XII

The experiment of Example X is repeated except that the 10 grams of Bonadur Red B is replaced with about 10 grams of 2,a-dibenzoyl-6,13-dichloro-dioxazine prepared as disclosed in copending application Ser. No. 519,104, filed Jan. 6, 1966 in the U.S. Patent Office, now U.S. Pat. No. 3,442,781. The image formed on the Nesa glass conforms to the original and is blue-red in color.

EXAMPLE XIII

The experiment of Example X is repeated except that the 10 grams of Bonadur Red B is replaced by about 10 grams of Diane Blue, C.I. No. 21180, 3,3'-methoxy-4,4'-diphenyl-bis(1"-azo-2"-hydroxy-3"-naphthanilide) available from Harmon Colors. The image on the Nesa glass conforms to the original and is blue-green in color.

EXAMPLE XIV

The experiment of Example X is repeated except that the 10 grams of Bonadur Red B is replaced by about 10 grams of N-2"-pyridyl-8,13-dioxodinaphtho-(1,2-2',3')-furan-6-carboxamide prepared as disclosed in copending application Ser. No. 421,281, filed Dec. 28, 1964 in the U.S. Patent Office, now U.S. Pat. No. 3,447,922. The image formed on the Nesa glass conforms to the original and is yellow in color.

EXAMPLE XV

The experiment of Example X is repeated except that the 10 grams of Bonadur Red B is replaced by about 10 grams of N-2"-(1",3"-diazyl)-8,13-dioxodinaphtho-(1,2-2',3')-furan-6-carboxamide prepared as disclosed in copending application Ser. No. 421,281, filed Dec. 28, 1964 in the U.S. Patent Office. The image formed on the Nesa glass conforms to the original and is yellow in color.

EXAMPLE XVI

The experiment of Example X is repeated except that the 10 grams of Bonadur Red B is replaced by about 10 grams of 2,4,6-tris(N-ethyl-N-hydroxyethyl-p-amino phenylazo) phloroglucinol prepared as disclosed in copending application Ser. No. 473,607, filed July 21, 1965 in the U.S. Patent Office and now abandoned. The image formed on the Nesa glass conforms to the original and is black.

Although specific components and proportions have been stated in the above description of preferred embodiments of the invention, other typical materials as listed above if suitable may be used with similar results. In addition, other materials may be added to the mixture to synergize, enhance, or otherwise modify the properties of the imaging layer. For example, various dyes, spectral sensitizers, or electrical sensitizers such as Lewis acids may be added to the several layers.

Other modifications and ramifications of the present invention will occur to those skilled in the art upon a reading of the present disclosure. These are intended to be included within the scope of this invention.

What is claimed is:
1. The method of photoelectrophoretic imaging comprising the steps of:
 (a) providing a substantially transparent first electrode;
 (b) providing an imaging layer in contact with said first electrode, said imaging layer comprising electrically photosensitive particles dispersed in a solid waxy matrix;
 (c) melting said solid matrix;
 (d) providing a second electrode in contact with said imaging layer; and
 (e) applying an electrical field between said first and second electrodes across said imaging layer while exposing said imaging layer to a pattern of activating electromagnetic radiation through said first electrode until an image is formed.

2. The method of claim 1 wherein said imaging layer is placed between two conductive electrodes.

3. The method of claim 1 wherein said imaging layer is placed between a conductive electrode and an insulating member.

4. The method of claim 1 wherein said imaging layer is placed between a conductive electrode and an insulating member and wherein said insulating member is uniformly electrostatically charged.

5. The method of claim 1 wherein said electric field is applied between said conductive electrode and a conductive roller.

6. The method of claim 1 wherein said electric field is applied between two conductive electrodes and further including an insulating member placed between the imaging layer and at least one of said conductive electrodes.

7. The method of claim 1 wherein said particles have a single color and a monochromatic image results.

8. The method of claim 1 wherein said particles are of at least two colors and a polychromatic image results.

9. The method of claim 1 wherein said imaging layer comprises metal-free phthalocyanine in a solid matrix.

10. The method of claim 1 wherein said imaging layer comprises electrically photosensitive particles dispersed in a paraffin wax.

11. The method of claim 1 wherein said imaging layer comprises electrically photosensitive particles dispersed in a microcrystalline wax.

12. The method of claim 1 wherein said imaging layer comprises electrically photosensitive particles dispersed in a halocarbon wax.

References Cited

UNITED STATES PATENTS

| | | | |
|---|---|---|---|
| 2,758,939 | 8/1956 | Sugarman | 96—1.4 |
| 2,839,400 | 6/1958 | Moncrieff-Yeates | 96—1.4 |
| 2,940,847 | 6/1960 | Kaprelian | 96—1.4 X |
| 3,291,601 | 12/1966 | Gaynor | 96—1.1 |
| 3,384,566 | 5/1968 | Clark | 204—181 |

DONALD LEVY, Primary Examiner

C. E. VAN HORN, Assistant Examiner

U.S. Cl. X.R.

96—1.3, 1.5